(12) United States Patent
Collot

(10) Patent No.: US 9,859,619 B2
(45) Date of Patent: Jan. 2, 2018

(54) SEGMENTED STRUCTURE, IN PARTICULAR FOR A SATELLITE ANTENNA REFLECTOR, WITH COMBINED ROTATION AND TRANSLATION DEPLOYMENT DEVICE

(71) Applicant: AIRBUS DEFENCE AND SPACE SAS, Les Mureaux (FR)

(72) Inventor: Alexandre Collot, Triel sur Seine (FR)

(73) Assignee: AIRBUS DEFENCE AND SPACE SAS, les Mureaux (FR)

( * ) Notice: Subject to any disclaimer, the term of this patent is extended or adjusted under 35 U.S.C. 154(b) by 11 days.

(21) Appl. No.: 15/102,059

(22) PCT Filed: Jan. 7, 2015

(86) PCT No.: PCT/FR2015/000004
§ 371 (c)(1),
(2) Date: Jun. 6, 2016

(87) PCT Pub. No.: WO2015/107283
PCT Pub. Date: Jul. 23, 2015

(65) Prior Publication Data
US 2016/0329640 A1 Nov. 10, 2016

(30) Foreign Application Priority Data
Jan. 17, 2014 (FR) .................. 14 00099

(51) Int. Cl.
*H01Q 19/10* (2006.01)
*H01Q 15/16* (2006.01)
(Continued)

(52) U.S. Cl.
CPC .......... *H01Q 15/162* (2013.01); *B64G 1/222* (2013.01); *B64G 1/44* (2013.01); *B64G 1/66* (2013.01); *H01Q 1/288* (2013.01); *H01Q 3/04* (2013.01)

(58) Field of Classification Search
CPC ......... H01Q 15/162; H01Q 1/288; H01Q 3/04
(Continued)

(56) References Cited

U.S. PATENT DOCUMENTS 4,811,034 A 3/1989 Kaminskas
5,570,102 A 10/1996 Kochiyama et al.

FOREIGN PATENT DOCUMENTS

WO 97/12806 A1 4/1997
WO 2006/041354 A1 4/2006

OTHER PUBLICATIONS

International Preliminary Report on Patentability dated Jul. 19, 2016, issued in corresponding International Application No. PCT/FR2015/000004, filed Jan. 7, 2015, 1 page.
(Continued)

*Primary Examiner* — Graham Smith
(74) *Attorney, Agent, or Firm* — Christensen O'Connor Johnson; Matthew Balint; John Denkenberger

(57) ABSTRACT

A segmented structure includes at least two panels, a so-called main panel and a so-called secondary panel, as well as at least one deployment device configured to move the connected secondary panel into a storage position or into a deployed position. The deployment device includes a translation system provided with at least one helical geared motor configured to translate the secondary panel relative to the main panel. The translation system further includes a rotation system configured to rotate the translation system and the secondary panel connected to the translation system, relative to said main panel.

11 Claims, 4 Drawing Sheets

(51) Int. Cl.
　　　*B64G 1/22*　　　(2006.01)
　　　*B64G 1/44*　　　(2006.01)
　　　*B64G 1/66*　　　(2006.01)
　　　*H01Q 1/28*　　　(2006.01)
　　　*H01Q 3/04*　　　(2006.01)

(58) Field of Classification Search
　　　USPC .......................................................... 343/839
　　　See application file for complete search history.

(56) References Cited

OTHER PUBLICATIONS

Written Opinion of the International Searching Authority dated Apr. 2, 2015, issued in corresponding International Application No. PCT/FR2015/000004, filed Jan. 7, 2015, 6 pages.

International Search Report dated Apr. 2, 2015, issued in corresponding International Application No. PCT/FR2015/000004, filed Jan. 7, 2015, 6 pages.

SEGMENTED STRUCTURE, IN PARTICULAR FOR A SATELLITE ANTENNA REFLECTOR, WITH COMBINED ROTATION AND TRANSLATION DEPLOYMENT DEVICE

The present invention relates to a segmented structure.

Said segmented structure comprises at least two panels which are interconnected and are to be deployed in space.

Although not exclusively, the present invention relates more specifically to a segmented structure which is part of an antenna reflector of a telecommunications satellite, in particular to a large-size antenna reflector, operating in high frequency bands. The size of the reflector is inversely proportional to the frequency (at constant gain). Such an antenna reflector generally has a rigid structure (referred to as a shell) which is provided with a reflective surface and reinforcing means on the rear of said surface, which are involved in supporting the shell and linking with the satellite.

The large size of the shell of such a reflector poses problems in terms of the overall dimensions when sending a satellite provided with such a reflector into space using a space launcher.

In addition, for rigid reflectors which have diameters of several meters, a segmented structure is provided, which comprises a plurality of panels, in particular a three-panel structure comprising a central panel and two end panels.

This segmented structure also comprises a deployment device for each end panel, which is capable of bringing the end panel, relative to the main panel:
 either into a storage position, in which the end panel is positioned on the main panel on the rear face thereof, the front face of the end panel being directed in the same direction as the front face of the main panel;
 or into a deployed position, in which the end panel is positioned alongside and against the main panel so as to form a continuous assembly at least on the front faces thereof (active part of the antenna).

In a segmented structure of this type, each end panel can thus occupy a storage position for transportation in the space launcher, and a deployed position when the satellite is in space.

The present invention relates to a segmented structure, in particular for a satellite antenna reflector, comprising at least two panels and a deployment device which makes it possible to carry out efficient and advantageous deployment of said two panels in space.

According to the invention, said segmented structure comprising:
 at least two panels, a first panel referred to as the main panel, comprising a front face and a rear face, and a second panel referred to as the secondary panel, also comprising a front face and a rear face; and
 at least one deployment device which is connected to the respective rear faces of said main and secondary panels and is capable of bringing said secondary panel into one or the other of the following two positions, relative to said main panel:
  a storage position, in which said secondary panel is positioned at least in part on said main panel on the rear face thereof, the front face of said secondary panel being directed in the same direction as the front face of said main panel; and
  a deployed position, in which said secondary panel is positioned towards the outside of the main panel, to the side and against said main panel in order to form a continuous assembly at least on the front faces thereof, is characterised in that said deployment device comprises:
 a translation system comprising at least one translation unit provided with a helical geared motor, said translation system being connected to said secondary panel and being capable of generating a translational movement of said secondary panel relative to said main panel; and
 a rotation system that is capable of causing said translation system and the secondary panel connected to said translation system to rotate relative to said main panel, said rotation system comprising at least one rotation unit capable of generating a rotation between a first structural element rigidly connected to the rear face of the main panel and a second structural element, to which the translation system is connected.

Thus, by means of the invention, the secondary panel of the segmented structure can be deployed efficiently and advantageously in space, from the storage position into the deployed position using a combined translation and rotation deployment device, as explained below.

In a preferred embodiment, the rotation system comprises two rotation units respectively arranged on either side of the main panel along an axis corresponding to the axis of rotation of said two rotation units. Preferably, each rotation unit comprises a rotary motor.

Furthermore, in a preferred embodiment, each translation unit comprises a rotary motor arranged on said second structural element, said rotary motor being capable of driving an endless screw acting on a third structural element rigidly connected to the rear face of the secondary panel so as to move the secondary panel in translation relative to the main panel.

Advantageously, each translation unit is provided with a flexible link.

Moreover, in a first embodiment, the translation system comprises at least two translation units, and each translation unit is arranged on a second structural element of the rotation system.

Furthermore, in a second embodiment, the translation system comprises a translation unit and at least one guiding unit producing a sliding link.

Moreover, in a preferred embodiment, the segmented structure comprises:
 a central main panel;
 two secondary panels arranged on either side of said central main panel in the deployed position so as to have a parabolic shape; and
 two deployment devices respectively associated with said secondary panels.

The present invention also relates to:
 a satellite antenna reflector which comprises a segmented structure of the above-mentioned type; and
 a satellite which comprises at least one segmented structure of this type or one antenna reflector of this type.

The present invention also relates to a method for deploying a segmented structure of the above-mentioned type.

According to the invention, this method comprises successive steps consisting, during deployment from the storage position to the deployed position, in:
a) rotating the translation system, to which the secondary panel is connected, in a first rotation direction by means of the rotation system, in order to space said secondary panel from said main panel;

b) translating the secondary panel in a first translation direction towards the outside by means of the translation system;

c) rotating the translation system, to which the secondary panel is connected, in a second rotation direction opposite to said first rotation direction by means of the rotation system, in order to bring said secondary panel substantially into the same average plane as said main panel; and d) translating the secondary panel in a second translation direction opposite to said first translation direction towards the inside by means of the translation system, in order to bring said secondary panel into the deployed position.

The figures of the accompanying drawings will show how the invention can be carried out. In these figures, identical reference numerals denote similar elements.

FIGS. 4A and 4B to 7A and 7B show, in a perspective view and in a side view, respectively, various successive steps of deploying a secondary panel with respect to a main panel of a segmented structure.

Figure 1:
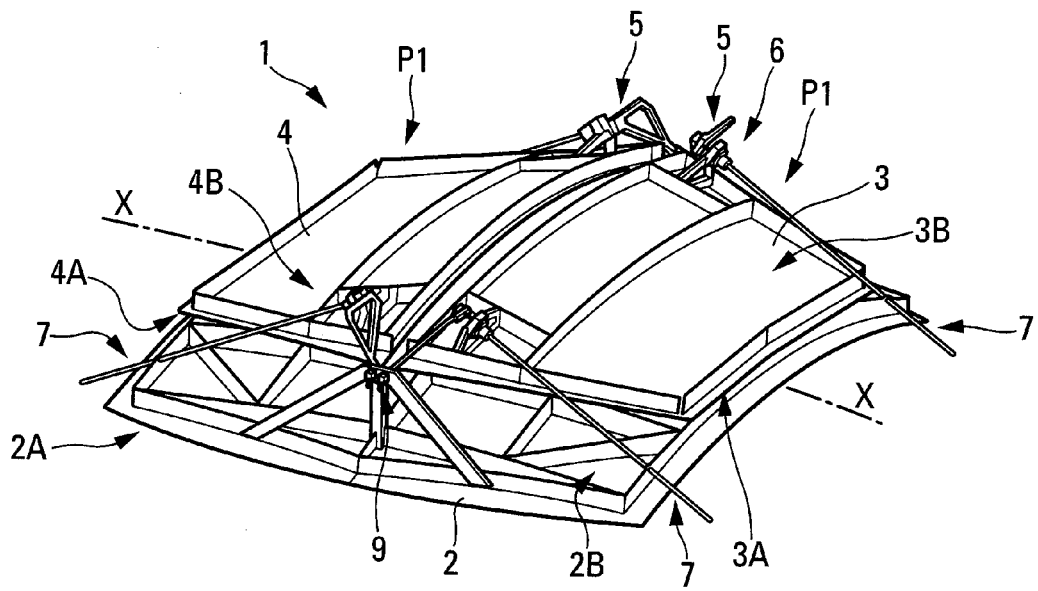
FIG. 1 is a schematic perspective view of a specific embodiment of a segmented structure illustrating the invention and comprising a central panel as well as two secondary panels, each of which is in a storage position.

The segmented structure 1, illustrating the invention and shown schematically in FIG. 1 in particular, is intended, more specifically although not exclusively, for an antenna reflector of a telecommunications satellite. Such an antenna reflector, when deployed in space, generally has a rigid structure (referred to as a shell) which is provided with a reflective surface, as well as reinforcing and support means (not shown) on the rear of said structure, which are involved in supporting the shell and linking with the satellite. In particular for reasons relating to the overall dimensions during the launch of the satellite by a space launcher, said structure is of the segmented type, i.e. it is formed of a plurality of segments or panels.

More precisely, the present invention relates to a segmented structure 1 comprising, as shown in FIG. 1:
at least two panels, namely at least one first panel 2, referred to as the main panel, comprising a front face 2A and a rear face 2B, and at least one second panel 3, 4, referred to as the secondary panel, also comprising a front face 3A, 4A and a rear face 3B, 4B; and
at least one deployment device 5 which is connected to the respective rear faces 2B and 3B, 4B of the main panel 2 and of a secondary panel 3, 4.

Figure 7A:
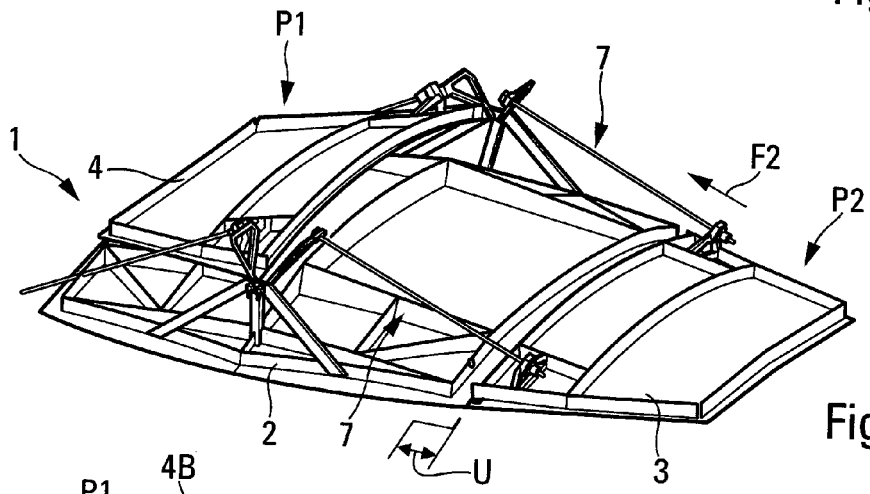
Figure 7B:
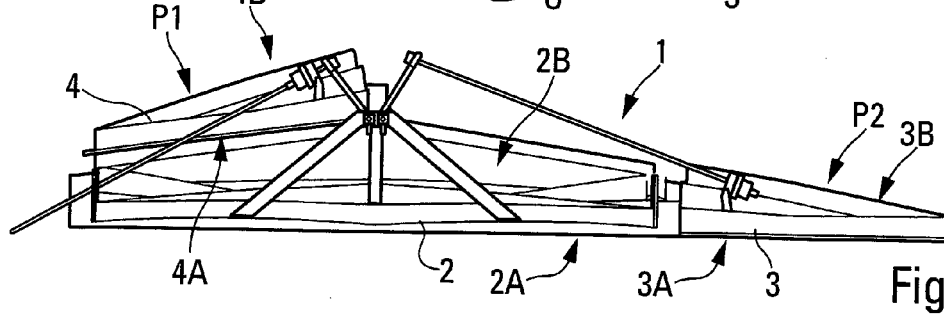

This deployment device 5 is capable of bringing a secondary panel, for example the secondary panel 3, into one or the other of the following two positions, relative to the main panel 2:
a storage position P1 as shown in FIG. 1, in which said secondary panel 3 is positioned at least in part, and preferably completely positioned, on the main panel 2 on the rear face 2B thereof. The front face 3A of the secondary panel 3 is directed in the same direction as the front face 2A of the main panel 2; and
a deployed position P2 as shown in FIGS. 7A and 7B, in which the secondary panel 3 is positioned to the side and against the main panel 2 in order to form a continuous assembly at least on the front faces 2A and 3A thereof.

In the description of the present invention:
"front face" and "rear face" are understood to mean the two faces of a panel, the front face 3A, 4A of a secondary panel 3, 4 being positioned at least in part on the rear face 2B of the main panel 2 in the storage position P1, each front face 2A, 3A, 4A corresponding in the case of an antenna reflector to the reflective face; and
"inside" and "outside" are understood to mean the positions of the different elements in question with respect to the centre of the segmented structure 1 in the deployed position of said structure, "inside" applying to the position closest to the centre, and "outside" applying to the position furthest away from the centre in said deployed position (in the direction of an axis X-X (FIG. 1), in this case a symmetry axis of the segmented structure 1).

In the preferred embodiment, which is shown in the drawings, the segmented structure 1 comprises:
a central main panel 2;
two secondary panels 3 and 4 arranged on either side of said central main panel 2 in the fully deployed position (FIG. 9) in such a way that these three panels 2, 3 and 4 have a parabolic shape in said fully deployed position; and
two deployment devices 5 respectively associated with said secondary panels 3 and 4.

In the situation in FIG. 1, the two secondary panels 3 and 4 are in the storage position P1.

Figure 2:
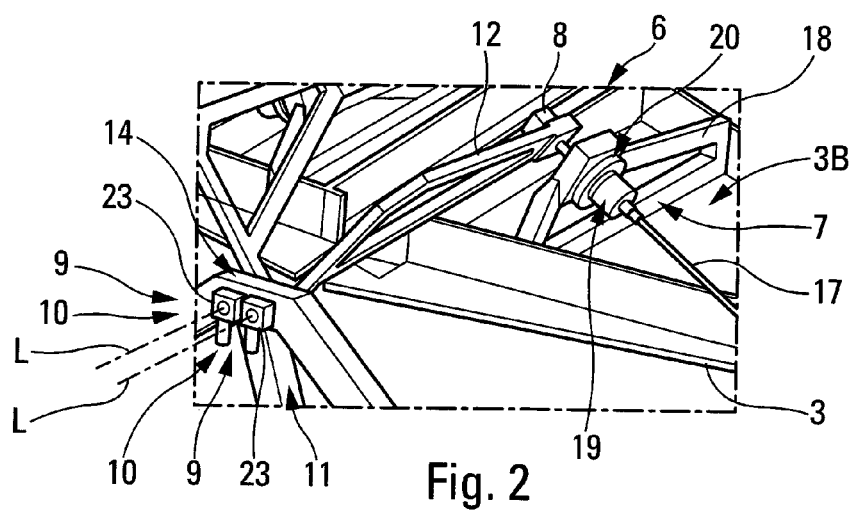
FIGS. 2 and 3 are enlarged partial schematic views of specific elements of the embodiment in FIG. 1.

According to the invention, each of the deployment devices 5 of the segmented structure 1 comprises:
a translation system 6 comprising at least one translation unit 7 provided with a helical geared motor 8 (FIG. 2). The translation system 6 is connected to the associated secondary panel 3, 4 and is capable of generating a translational movement of said secondary panel 3, 4 relative to said main panel 2; and
a rotation system 9 that is capable of causing said translation system 6 and the secondary panel 3, 4 connected to said translation system 6 to rotate relative to said main panel 2. The rotation system 9 comprises at least one rotation unit 10 capable of generating a rotation between a structural element 11 rigidly connected to the rear face 2B of the main panel 2 and a structural element 12, to which the translation system 6 is connected (FIG. 2).

Figure 5A:
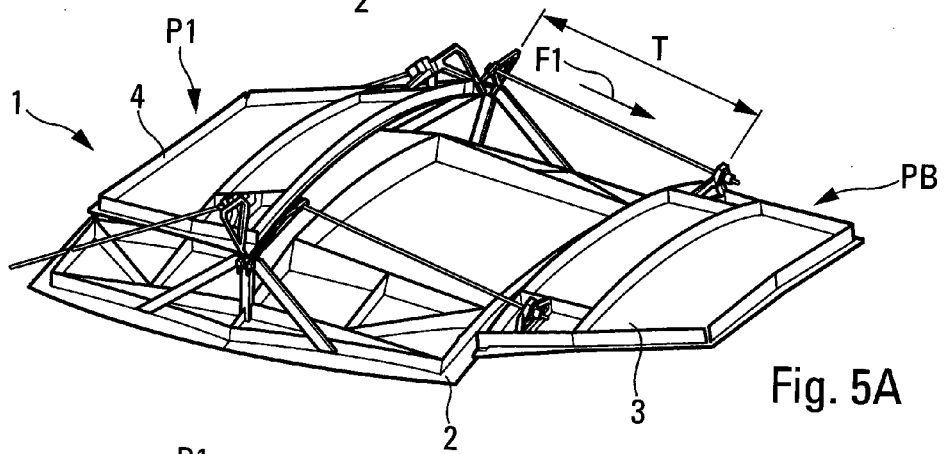
Figure 5B:
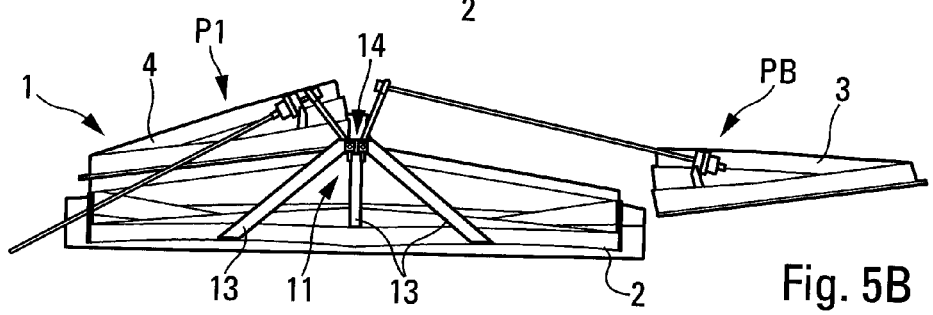
Figure 6A:
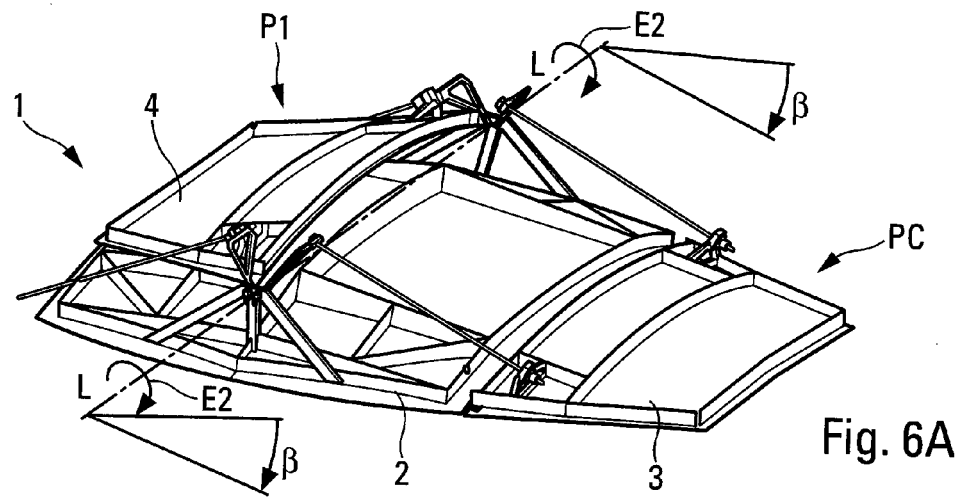
Figure 6B:
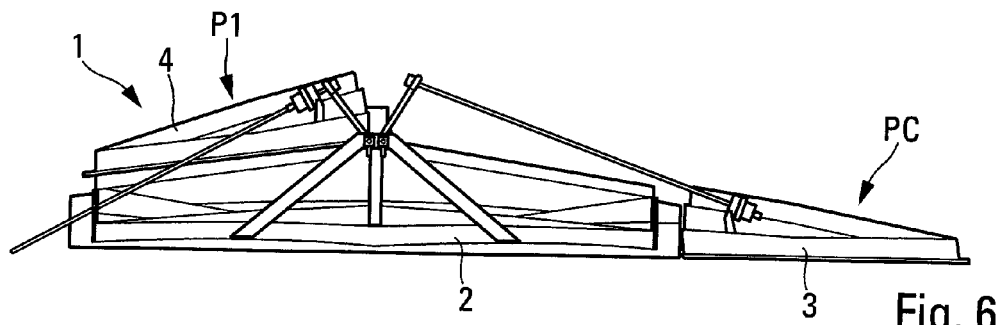

In a specific embodiment, the structural element 11 comprises a plurality of feet 13, for example three feet 13 (FIG. 5B), that are fixed by a first end to the rear face 2B of the main panel 2 and join at a summit 14, in the region of which the rotation system 9 is provided. In a specific embodiment, two units 10 for rotation relative to the devices 5 for deploying the two panels 3 and 4 are arranged side by side in the region of said summit 14 (FIG. 2).

Furthermore, the structural element 12 may be in the shape of a polygonal frame, as shown in FIG. 2 for example.

Such a deployment device 5 (including the combination of a translation system 6 and a rotation system 9) makes it possible to carry out effective and advantageous deployment of the secondary panel 3, 4, with which it is associated, from the storage position P1 to the deployed position P2, as specified below.

In a preferred embodiment, each translation unit 6 comprises, as shown in FIG. 2, a rotary motor 8 arranged on the structural element 12. The rotary motor 8 is capable of driving an endless screw 17 acting on a structural element 18 rigidly connected to the rear face 3B of the secondary panel 3 so as to move the secondary panel 3 in translation relative to the main panel 2.

Figure 3:
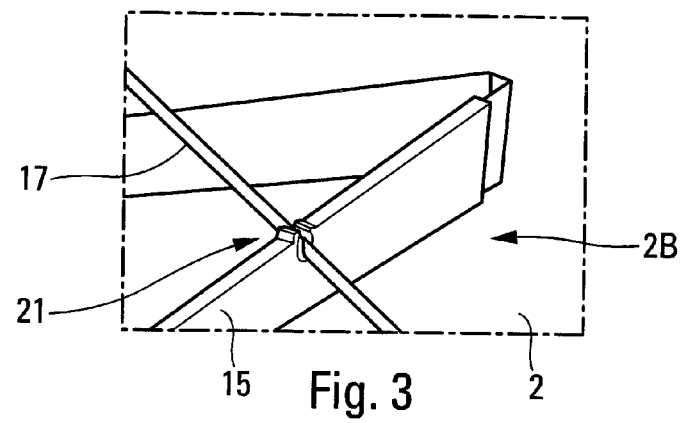

In the region of the connection to the structural element 18, the translation unit 6 comprises a linear ball bearing 19 and a flexible link 20. Towards its other end, the endless screw 17 passes through an opening made in a structural element 15 that is provided with stacking means 21 which allow it to be supported in the storage position P1, as shown in FIG. 3.

Figure 4A:
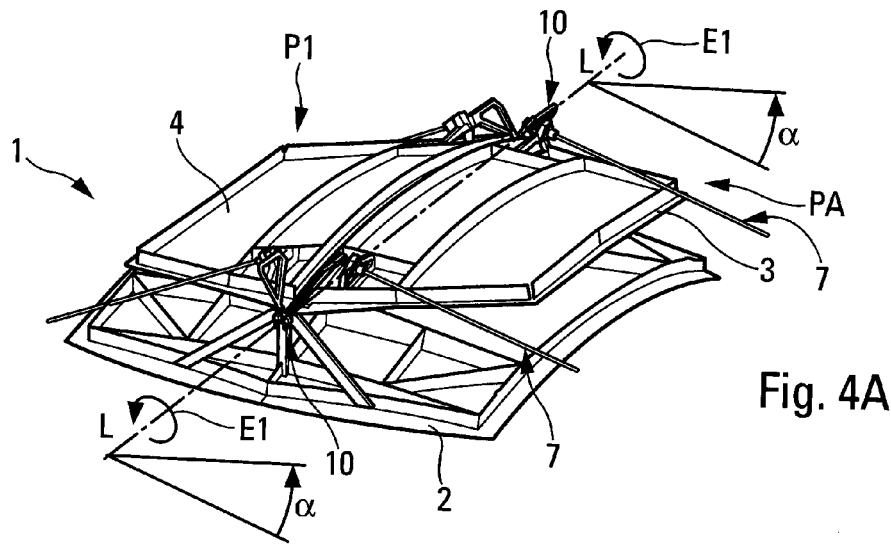
Figure 4B:
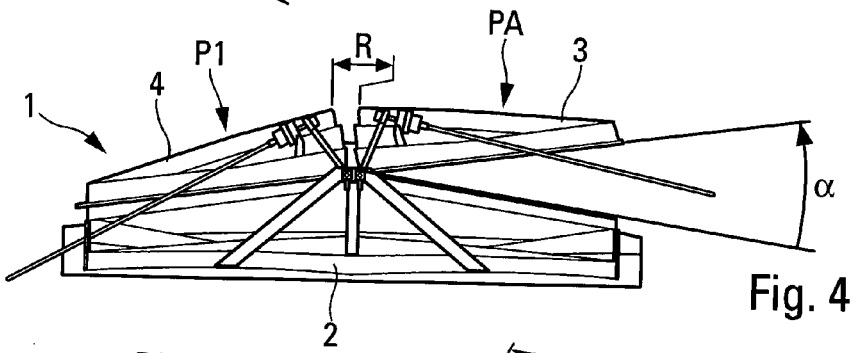

Furthermore, in a preferred embodiment, the rotation system 9 comprises two rotation units 10 respectively arranged on either side of the main panel 2 along an axis L-L (FIG. 4A) corresponding to the axis of rotation of said two rotation units 10. Preferably, each rotation unit 10 comprises a rotary motor 23 (FIG. 2).

Moreover, within the scope of the present invention, the translation system 6 can be produced in various ways.

In a first embodiment, which is shown in FIGS. 1 and 4A to 7B, the translation system 6 comprises at least two translation units 7. Each translation unit 7 is arranged on a structural element 12 of the rotation system 6. The two translation units 7 are arranged on either side of the main panel 2 relative to the axis X-X.

Figure 8:
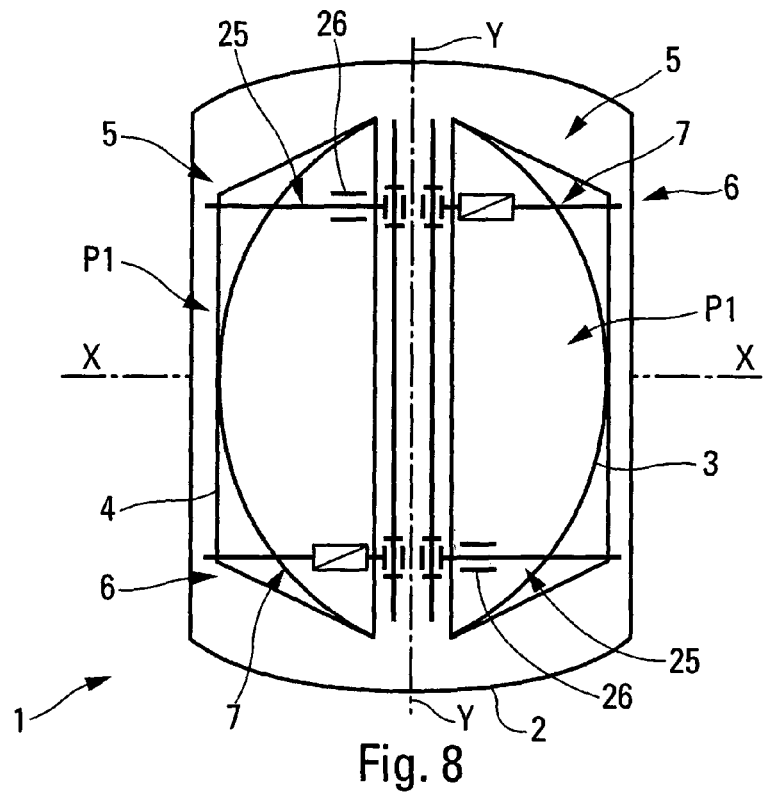
FIGS. 8 and 9 are schematic plan views of a specific embodiment of a translation system of a deployment device.
Figure 9:
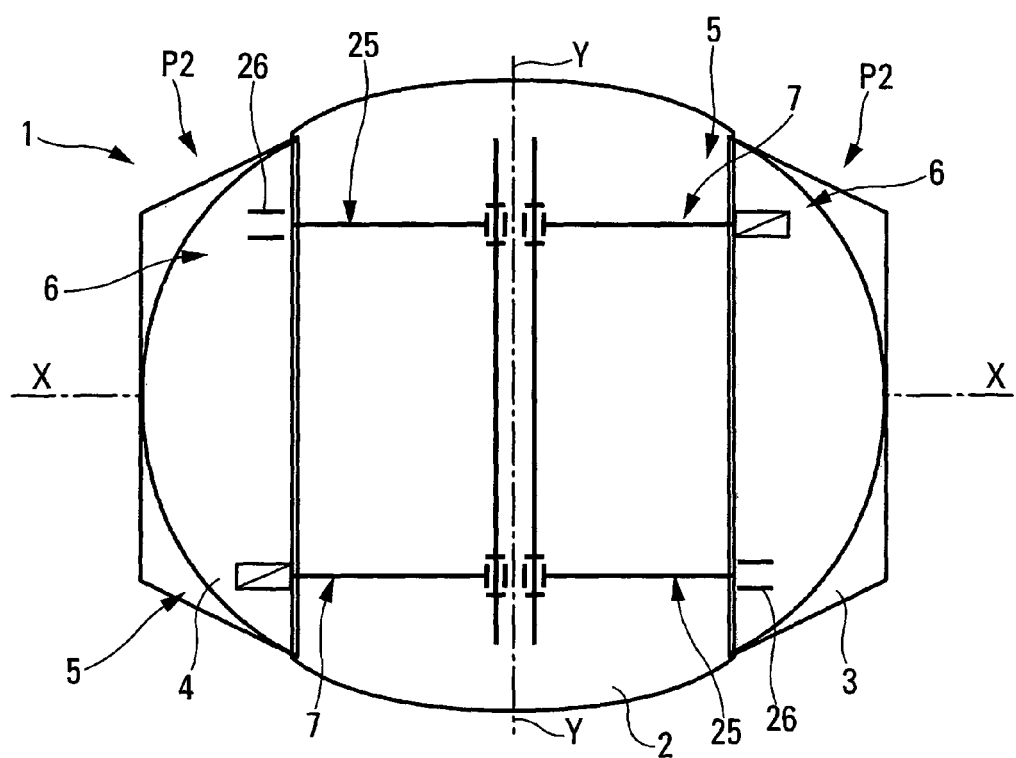

Furthermore, in a second embodiment, which is shown in FIGS. 8 and 9, the translation system 6 of the deployment device 5 associated with a secondary panel 3, 4 comprises:
  a translation unit 7, as described above, which is shown very schematically; and
  a guiding unit 25 comprising a guide sleeve 26 for producing a sliding link.

The translation unit 7 is arranged on one side of the axis X-X towards the periphery of the main panel 2, and the guiding unit 25 is arranged on the other side of the axis X-X likewise towards the periphery of the main panel 2. FIGS. 8 and 9 likewise show an axis Y-Y that is orthogonal to the axis X-X.

The deployment devices 5 of the segmented structure 1, which are associated with the different secondary panels 3 and 4 of said segmented structure 1, thus make it possible to carry out a deployment of the segmented structure 1 from a full storage position (in which all the secondary panels 3 and 4 are in a storage position P1) to a fully deployed position (in which all the secondary panels 3 and 4 are in a deployed position P2).

The deployment device 5 also comprises means which are not shown (for example a central unit) for controlling, in particular, the rotary motors 8 and 23 (electric motors).

Moreover, the segmented structure 1 can comprise conventional means (not shown) for supporting the different panels 2, 3 and 4 in the storage position P1. Said support means are released before deployment so that each deployment device 5 can implement the deployment explained below.

The operation of said deployment device 5, for the deployment of one 3 of said secondary panels 3, 4 from the storage position P1 in FIG. 1 into the deployed position P2 in FIGS. 7A and 7B, is as follows:
a) after uncoupling the secondary panel 3 from the main panel 2, from the storage position P1 in FIG. 1 for example, the translation system 6, to which the secondary panel 3 is connected, is rotated about the axis L-L by means of the rotation system 9. This rotation is carried out in a first rotation direction E1 (and by an angle α). This (disengagement) rotation makes it possible for the secondary panel 3 to be spaced apart from the main panel 2 and for it to be brought into a position PA shown in FIGS. 4A and 4B. This position PA makes it possible to ensure the kinematic movements. FIG. 4A, 4B to 7A, 7B show, in a perspective view and in a side view, respectively, different successive steps of deploying the secondary panel 3 relative to the main panel 2. It may also be possible to move the two panels 3 and 4 simultaneously, if the remaining play R (shown in FIG. 4B) between the adjacent ends of the two panels 3 and 4, after the rotation phase, is sufficient. This makes it possible for the number of disengagement motors to be reduced. However, deploying the panels 3 and 4 one after the other makes it possible for the value of the angle α to be increased, which is advantageous in terms of ensuring the deployment phase;
b) the secondary panel 3 is translated in a first translation direction F1 towards the outside (and by a distance T) by means of the translation system 6, in order to bring the secondary panel 3 into a position PB shown in FIGS. 5A and 5B;
c) the translation system 6, to which the secondary panel 3 is connected, is rotated in a second rotation direction E2 (opposite to the direction E1) by an angle β by means of the rotation system 9, in order to bring the secondary panel substantially into the same average plane as the main panel 2, in a position PC shown in FIGS. 6A and 6B; and
d) the secondary panel 3 is translated in a second translation direction F2 (opposite to the direction F1) towards the inside and by a distance U by means of the translation system 6, in order to bring the secondary panel 3 into contact with the main panel 2 in the deployed position P2, as shown in FIGS. 7A and 7B.

The same deployment method is implemented for the secondary panel 4 in order to eventually obtain a fully deployed position of the segmented structure 1.

Of course, the device 5 can also bring the segmented structure from the deployed position P2 into the storage position P1, should that become necessary, for example for a validation operation, by carrying out the above-mentioned operations in reverse order (d, c, b, a), each operation (rotation, translation) being implemented in the opposite direction.

Moreover, the segmented structure 1 may comprise auxiliary means (not shown) for allowing a precise final positioning between a secondary panel 3, 4 and the main panel 2, for example in the situation in FIGS. 7A and 7B for the secondary panel 3, as well as means for locking the panels in the fully deployed position of the segmented structure 1.

The invention claimed is:
1. Segmented structure, in particular for a satellite antenna reflector, said segmented structure comprising:
  at least two panels, intended to be deployed in space, a first panel referred to as the main panel, comprising a front face and a rear face, and a second panel referred to as the secondary panel, also comprising a front face and a rear face; and
  at least one deployment device connected to the respective rear faces of said main and secondary panels and is configured to bring said secondary panel into one or the other of the following two positions, relative to said main panel;
    a storage position, in which said secondary panel is positioned at least in part on said main panel on the rear face thereof, the front face of said secondary panel being directed in the same direction as the front face of said main panel; and
    a deployed position, in which said secondary panel is positioned towards the outside of the main panel, to the side and against said main panel in order to form a continuous assembly at least on the front faces thereof, wherein said deployment device comprises:

a translation system comprising at least one translation unit provided with a helical geared motor, said translation system being connected to said secondary panel and being configured to generate a translational movement of said secondary panel relative to said main panel; and a rotation system configured to cause said translation system and the secondary panel connected to said translation system to rotate relative to said main panel, said rotation system comprising at least one rotation unit configured to generate a rotation between a first structural element rigidly connected to the rear face of the main panel and a second structural element, to which the translation system is connected.

2. Segmented structure according to claim 1, wherein said rotation system comprises two rotation units respectively arranged on either side of the main panel along an axis corresponding to the axis of rotation of said two rotation units.

3. Segmented structure according to claim 1, wherein each rotation unit comprises a rotary motor.

4. Segmented structure according to claim 1, wherein each translation unit comprises a rotary motor arranged on said second structural element, said rotary motor being configured to drive an endless screw acting on a third structural element rigidly connected to the rear face of the secondary panel so as to move the secondary panel in translation relative to the main panel.

5. Segmented structure according to claim 1, wherein each translation unit is provided with a flexible link.

6. Segmented structure according to claim 1, wherein the translation system comprises at least two translation units, and in that each translation unit is arranged on a second structural element of the rotation system.

7. Segmented structure according to claim 1, wherein the translation system comprises a translation unit and at least one guiding unit producing a sliding link.

8. Segmented structure according to claim 1, wherein the structure comprises:

a central main panel;

two secondary panels arranged on either side of said central main panel in the deployed position so as to have a parabolic shape; and two deployment devices respectively associated with said secondary panels.

9. Satellite antenna reflector, wherein the satellite antenna reflector comprises a segmented structure according to claim 1.

10. Satellite, wherein the satellite comprises at least one segmented structure according to claim 1.

11. Method for deploying a segmented structure according to claim 1, wherein the method comprises successive steps consisting, during deployment from the storage position to the deployed position, in:

a) rotating the translation system, to which the secondary panel is connected, in a first rotation direction by means of the rotation system, in order to space the secondary panel from the main panel;

b) translating the secondary panel in a first translation direction towards the outside by means of the translation system;

c) rotating the translation system, to which the secondary panel is connected, in a second rotation direction opposite to said first rotation direction by means of the rotation system, in order to bring the secondary panel substantially into the same average plane as the main panel; and d) translating the secondary panel in a second translation direction opposite to said first translation direction towards the inside by means of the translation system, in order to bring said secondary panel into the deployed position.

* * * * *